(12) United States Patent
Kono et al.

(10) Patent No.: US 11,536,150 B2
(45) Date of Patent: Dec. 27, 2022

(54) SEAL DEVICE

(71) Applicant: EAGLE INDUSTRY CO., LTD., Tokyo (JP)

(72) Inventors: Toru Kono, Tokyo (JP); Akira Urabe, Tokyo (JP)

(73) Assignee: EAGLE INDUSTRY CO., LTD.

( * ) Notice: Subject to any disclaimer, the term of this patent is extended or adjusted under 35 U.S.C. 154(b) by 68 days.

(21) Appl. No.: 17/050,420

(22) PCT Filed: May 17, 2019

(86) PCT No.: PCT/JP2019/019617
§ 371 (c)(1),
(2) Date: Oct. 23, 2020

(87) PCT Pub. No.: WO2019/225490
PCT Pub. Date: Nov. 28, 2019

(65) Prior Publication Data
US 2021/0189896 A1 Jun. 24, 2021

(30) Foreign Application Priority Data
May 21, 2018 (JP) .............................. JP2018-097253

(51) Int. Cl.
*F01D 11/00* (2006.01)
*F02C 7/28* (2006.01)
*F16J 15/08* (2006.01)

(52) U.S. Cl.
CPC .............. *F01D 11/005* (2013.01); *F02C 7/28* (2013.01); *F05D 2240/55* (2013.01); *F16J 15/0887* (2013.01)

(58) Field of Classification Search
CPC ...... F16J 15/00; F16J 15/0887; F16J 15/0893; F01D 11/00; F01D 11/005; F01D 11/006;
(Continued)

(56) References Cited

U.S. PATENT DOCUMENTS

| 2,598,176 A | 5/1952 | Johnstone ................... 253/39.15 |
| 5,104,286 A * | 4/1992 | Donlan ..................... F01D 25/30 |
| | | 277/641 |

(Continued)

FOREIGN PATENT DOCUMENTS

| CN | 101694181 | 4/2010 | ............. F01D 11/00 |
| CN | 102278147 | 12/2011 | ............. F01D 11/00 |

(Continued)

OTHER PUBLICATIONS

First Office Action issued in Chinese Patent Appln. Serial No. 201980027758.5, dated Feb. 10, 2022, with English translation, 13 pages.

(Continued)

*Primary Examiner* — Nathan Cumar
(74) *Attorney, Agent, or Firm* — Hayes Soloway P.C.

(57) ABSTRACT

A seal device is configured so that seal properties can be held over a long period of time. A seal device 1 inserted into and disposed between grooves each formed at first and second components which are adjacent to each other and collectively form a housing structure includes a first seal member inserted into the groove of the first component, a second seal member inserted into the groove of the second component, and a partitioning member extending between the first and second seal members to partition a space between the grooves of the first and second components and arranged movably relative to the first and second seal members.

15 Claims, 13 Drawing Sheets

(58) Field of Classification Search
CPC .. F01D 11/008; F02C 7/00; F02C 7/28; F05D 2240/55; F05D 2240/57
USPC .......................................................... 277/644
See application file for complete search history.

(56) References Cited

U.S. PATENT DOCUMENTS

| | | | | |
|---|---|---|---|---|
| 9,004,495 B2* | 4/2015 | Vasagar | ................ | F16J 15/442 |
| | | | | 277/585 |
| 2002/0090296 A1* | 7/2002 | Kuwabara | ............. | F01D 11/005 |
| | | | | 415/169.1 |
| 2004/0173975 A1* | 9/2004 | Hirst | ...................... | F01D 25/24 |
| | | | | 277/603 |
| 2008/0012323 A1 | 1/2008 | Kowalczyk | ................... | 285/336 |
| 2009/0026713 A1* | 1/2009 | Fujimoto | ............ | F16J 15/0887 |
| | | | | 277/543 |
| 2010/0201080 A1 | 8/2010 | Kinitake et al. | ............. | 277/641 |
| 2011/0304104 A1 | 12/2011 | McMahan et al. | ........... | 277/637 |
| 2012/0261887 A1 | 10/2012 | Vasagar | ........................ | 277/543 |
| 2014/0308113 A1* | 10/2014 | Westphal | ............... | F01D 25/28 |
| | | | | 415/134 |
| 2015/0102566 A1* | 4/2015 | Hanumanthan | ...... | F16J 15/0887 |
| | | | | 277/591 |
| 2016/0047262 A1 | 2/2016 | Cernay et al. | .......... | F01D 11/02 |
| 2016/0201493 A1* | 7/2016 | Davis | ........................ | F02C 7/28 |
| | | | | 277/595 |

FOREIGN PATENT DOCUMENTS

| | | | | |
|---|---|---|---|---|
| CN | 107956770 | 4/2018 | ................ | F16B 5/00 |
| DE | 37 42 557 | 6/1989 | ................ | F16M 1/00 |
| DE | 10 2013 205 922 | 9/2016 | ................ | F16J 15/08 |
| JP | 2002-201913 | 7/2002 | ................ | F01D 11/00 |
| JP | 2005-16324 | 1/2005 | ............. | F01D 25/24 |
| JP | 2007-218375 | 8/2007 | ................ | F16J 15/08 |

OTHER PUBLICATIONS

European Search Report issued in related European Patent Application Serial No. 19807451.0, dated Feb. 23, 2022, 7 pages.
International Preliminary Report on Patentability issued in PCT/JP2019/019617, dated Nov. 24, 2020, 5 pages.
International Search Report and Written Opinion issued in PCT/JP2019/019617, dated Aug. 6, 2019, with English translation, 14 pages.
Korean Official Action issued in related Korean Patent Application Serial No. 10-2020-7032806, dated May 3, 2022, with translation, 9 pages.

* cited by examiner (a)

(b)

SEAL DEVICE

TECHNICAL FIELD

The present invention relates to a seal device used for a housing structure of power equipment.

BACKGROUND ART

Typically, power equipment such as a gas turbine or an engine is configured such that sealing target fluid is housed in a substantially circular ring-shaped housing. The housing is configured such that members such as multiple platforms or multiple transition pieces are coupled to each other in a circumferential direction through seal devices, and therefore, outflow of the sealing target fluid is prevented. Specifically, the members adjacent to each other in the circumferential direction are coupled with a clearance for preventing contact due to, e.g., the pressure of the sealing target fluid, thermal expansion due to a high temperature, or vibration upon operation.

For example, a seal device as described in Patent Citation 1 is formed in a plate shape. Both end portions of the seal device in a transverse direction thereof are each inserted into a pair of opposing grooves formed at end surfaces of coupled platforms, and the seal device is disposed between the grooves. The seal device is pressed by purge air and comes into contact with an inner surface of each groove, and therefore, can seal a clearance between the coupled platforms.

CITATION LIST

Patent Literature

Patent Citation 1: JP 2002-201913 A (second and third pages, FIG. 10)

SUMMARY OF INVENTION

Technical Problem

However, in the seal device of Patent Citation 1, when, e.g., relative displacement of the grooves due to vibration generated upon operation of a gas turbine or deformation of the grooves themselves due to thermal expansion occurs, the plate-shaped seal device moves relative to the inner surfaces of the grooves with the seal device contacting the inner surfaces on one side. By such relative movement, locally-strong friction force is generated, leading to abrasion of the seal device. In some cases, there is a probability that a hole is caused due to abrasion or that internal stress in, e.g., a shearing/compression/tensile/curving direction is caused in the plate-shaped seal device and cracking or rupturing is caused in the seal device.

The present invention has been made in view of these problems, and is intended to provide a seal device configured so that seal properties can be held over a long period of time.

Solution to Problem

For solving the above-described problems, a seal device according to the present invention is
a seal device inserted into and disposed between grooves each formed at each of first and second components which are adjacent to each other and collectively form a housing structure, including:
a first seal member inserted into the groove of the first component;
a second seal member inserted into the groove of the second component; and
a partitioning member extending between the first and second seal members to partition a space between the grooves of the first and second components and arranged movably relative to the first and second seal members. According to the aforesaid feature, when, e.g., relative displacement of the grooves of the first and second components due to vibration or deformation of the grooves themselves and/or due to thermal expansion occurs, each of the first and second seal members and the partitioning member move relative to each other, and therefore, the seal device can follow the displacement, deformation, etc. Thus, the seal members can be easily equally brought into contact with inner surfaces of the grooves, it is less likely to generate locally-strong friction force on the first and second seal members, and internal stress generated in the first and second seal members can be decreased. Consequently, seal properties can be held over a long period of time.

Preferably, the partitioning member may be formed from a thin plate. According to this configuration, the partitioning member exhibits flexibility, and therefore, excellent followability for relative displacement, deformation, etc. of the grooves of the first and second components is exhibited.

Preferably, the partitioning member may include a base portion formed in a flat plate shape and projecting portions formed at both ends of the base portion in a transverse direction thereof and extending a longitudinal direction of the partitioning member and having a greater thickness than that of the base portion. Each of the first and second seal members is provided with a hollow in which the projecting portions are housed and an opening which is formed with a shorter dimension in a thickness direction than the dimension of each projecting portion in the thickness direction and into which the base portion is inserted. According to this configuration, the base portion is inserted into the openings and the projecting elements are housed in the space, and therefore, the partitioning member and the first and second seal members can be coupled so that the projecting elements of the partitioning member can move relative to each other in the hollows of the first and second seal members.

Preferably, the projecting portions may be formed in such a manner that both end portions of the partitioning member in a transverse direction thereof are folded back. According to this configuration, the projecting portions can be easily formed integrally with the partitioning member.

Preferably, the projecting portions may be divided into multiple projecting elements scattered in the longitudinal direction. According to this configuration, the base portion positioned between the projecting elements adjacent to each other in the longitudinal direction can be easily curved, and therefore, the partitioning member exhibits excellent flexibility.

Preferably, the projecting elements may be sorted into a first group in which the projecting elements are formed by folding back the end portions of the partitioning member to a front side of the base portion and a second first group in which the projecting elements are formed by folding back the end portions of the partitioning member to a back side of the base portion. According to this configuration, the projecting elements are fixed in the hollows of the seal members on the front and back sides of the base portion, and therefore, the partitioning member is easily arrangeable at a desired position with respect to the first and second seal members.

Preferably, each of the first and second seal members may be divided into plural parts aligned in the longitudinal direction thereof. According to this configuration, the degree of freedom in relative movement of the first and second seal members is high.

Preferably, the first and second seal members and the partitioning member may be made of identical alloy containing nickel. According to this configuration, the first and second seal members and the partitioning member have the same properties, and therefore, the amount of deformation of these members due to thermal expansion is substantially equal.

DESCRIPTION OF EMBODIMENTS

Hereinafter, the modes for implementing a seal device according to the present invention will be described with reference to embodiments.

First Embodiment

A seal device according to a first embodiment will be described with reference to FIGS. 1 to 6. In terms of the flow of sealing target fluid, the upper right side in the plane of paper of FIG. 1 will be hereinafter described as an upstream side U of the seal device, and the lower left side in the plane of paper will be hereinafter described as a downstream side D of the seal device.

The seal device 1 according to the first embodiment of the present invention is configured to seal, when multiple transition pieces forming part of a housing structure of a combustor unit are arrayed and coupled in an annular shape in a not-shown gas turbine mainly including an air compressor, the combustor unit, and a turbine unit, a clearance G between transition pieces 50A, 50B as a first component and a second component adjacent to each other in a circumferential direction.

Figure 1:
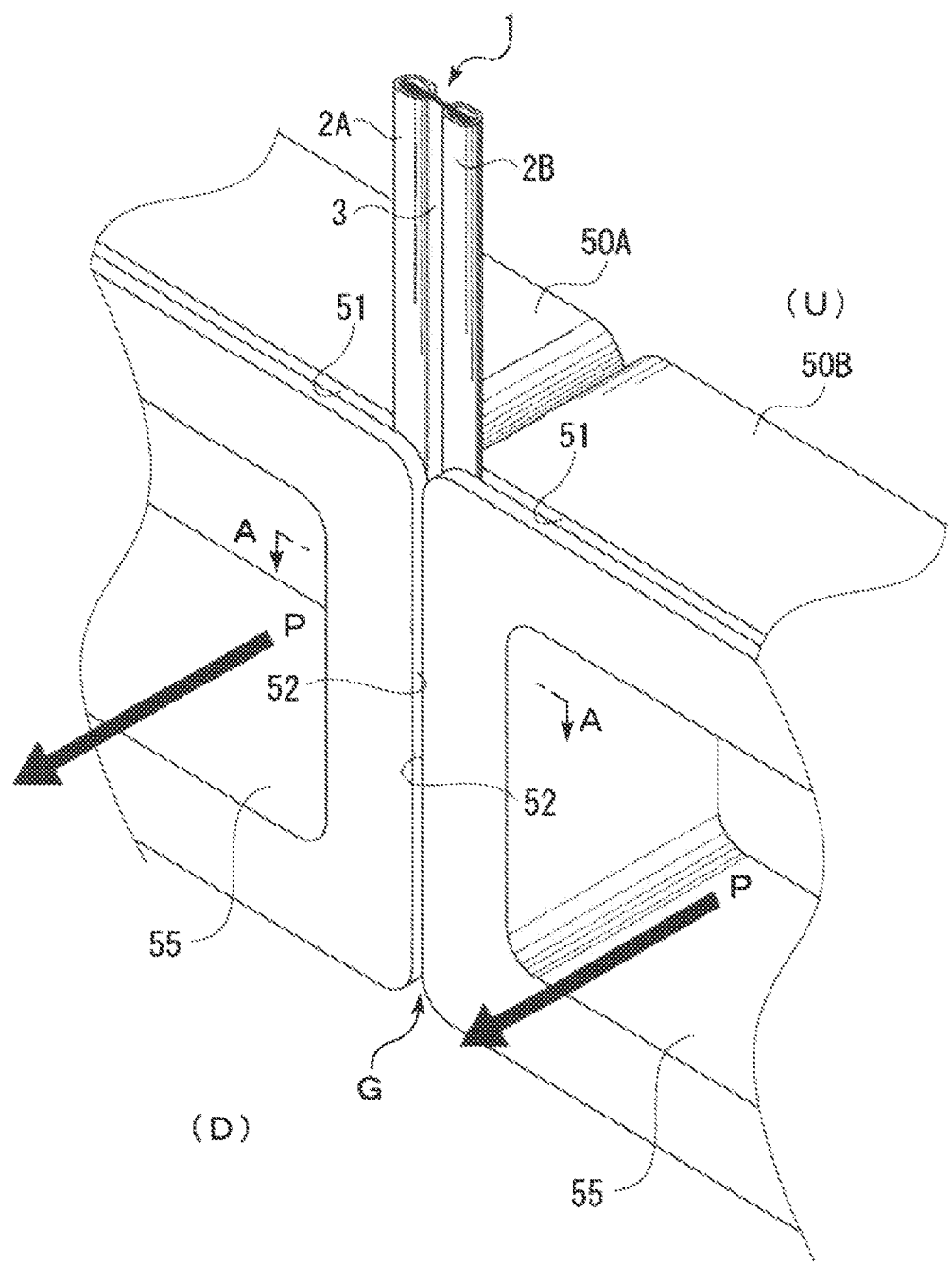
FIG. 1 is a perspective view schematically illustrating a state in which a clearance is sealed by a seal device according to a first embodiment of the present invention.

As illustrated in FIG. 1, the transition pieces 50A, 50B are rectangular tubular bodies, and rectangular paths 55 are each formed at center portions of the transition pieces 50A, 50B. The upstream side U of each path 55 communicates with the inside of a not-shown combustion liner of the combustor unit, and the downstream side D of each path 55 communicates with the inside of the not-shown turbine unit. Each path 55 guides the sealing target fluid P from the inside of the combustion liner to the inside of the turbine unit (as shown in the direction of a thick black arrow in FIG. 1).

Figure 4:
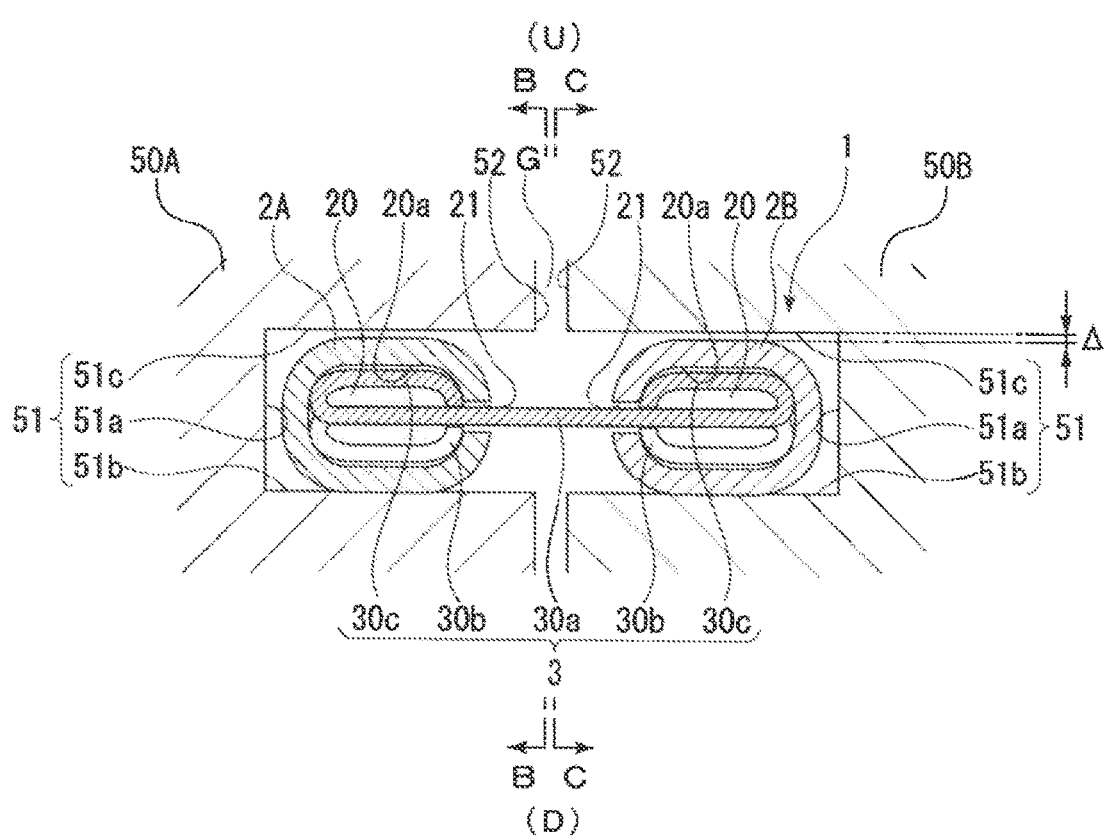
FIG. 4 is an A-A sectional view illustrating the seal device according to the first embodiment inserted into each groove.

U-shaped grooves 51 continuously formed in an annular shape are each formed at outer peripheral portions of the transition pieces 50A, 50B, and each groove 51 is partitioned by a bottom surface 51a and inner surfaces 51b, 51c extending substantially in the vertical direction from end portions of the bottom surface 51a (see FIG. 4). The inner surface 51b described herein is on the downstream side D, and the inner surface 51c described herein is on the upstream side U. These grooves 51 are formed such that the bottom surfaces 51a face each other and are substantially parallel with each other when side end surfaces 52 of the transition pieces 50A, 50B are arranged facing each other.

The transition pieces 50A, 50B adjacent to each other are coupled with the clearance G for preventing contact due to, e.g., the pressure of the sealing target fluid, thermal expansion caused by a high temperature, or vibration upon operation, and the seal device 1 is used for preventing outflow of the sealing target fluid P through the clearance G. Hereinafter, the seal device 1 will be described.

Figure 2:
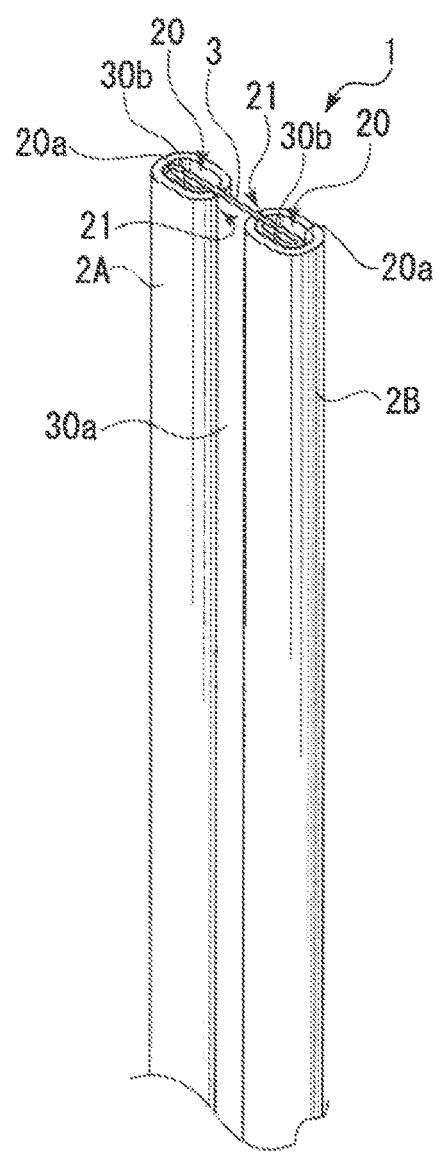
FIG. 2 is a perspective view illustrating the seal device according to the first embodiment.
Figure 3:
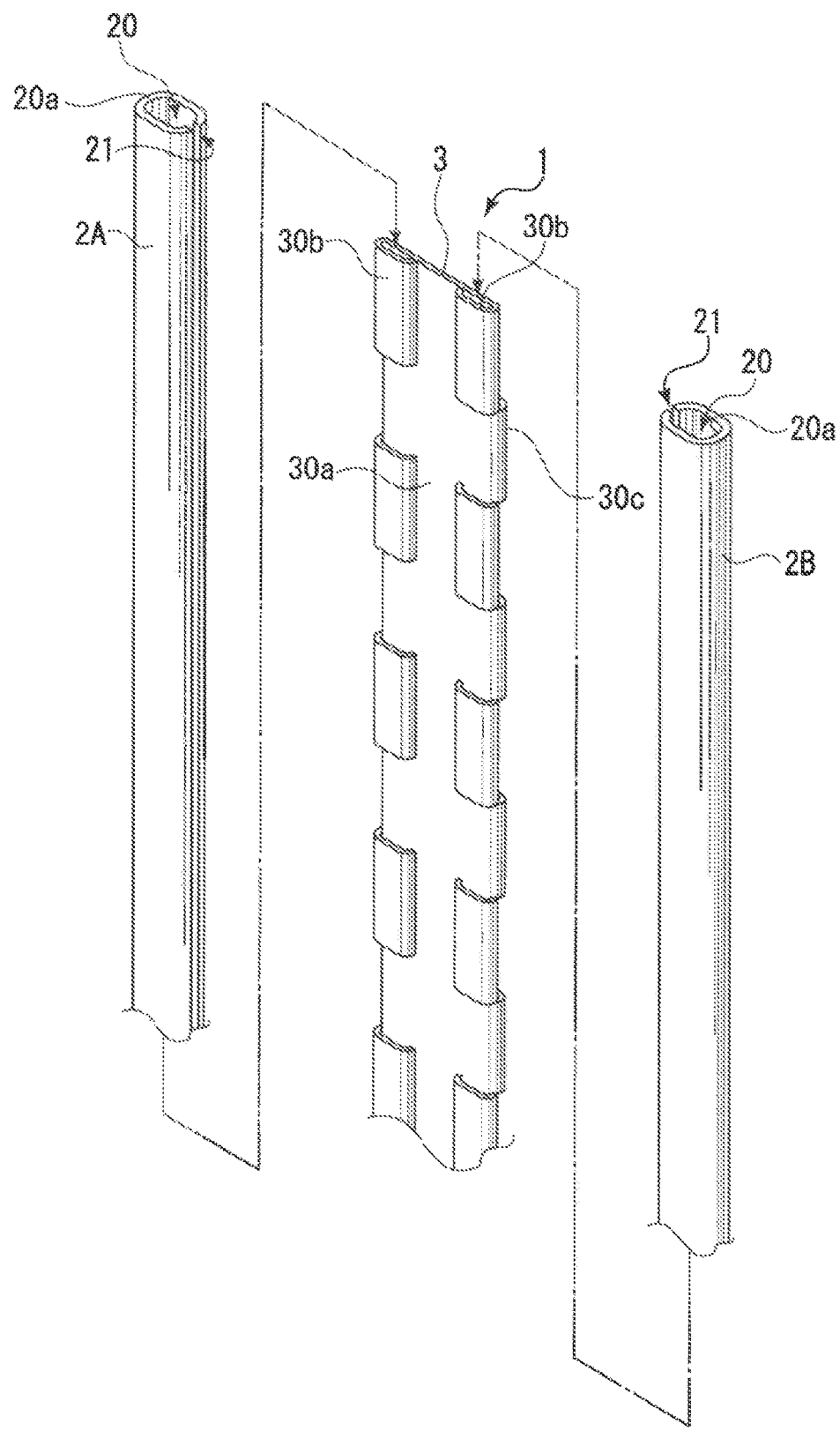
FIG. 3 is an exploded perspective view illustrating the seal device according to the first embodiment.

As illustrated in FIGS. 2 to 4, the seal device 1 includes a seal member 2A inserted into the groove 51 of the transition piece 50A (see FIG. 4), a seal member 2B inserted into the groove 51 of the transition piece 50B (see FIG. 4), and a partitioning member 3 extending between the seal members 2A, 2B to partition a space between the grooves 51 (see FIG. 4) and coupled to each of the seal members 2A, 2B. The seal device 1 is disposed between the grooves 51 across a longitudinal direction of the partitioning member 3.

The board thickness of the partitioning member 3 is 1/30 to 1/5 times (more preferably 1/20 to 1/10 times) as great as the dimension of the seal member 2A in a board thickness direction of the partitioning member 3 (i.e., a board thickness direction of a later-described base portion 30a of the partitioning member 3, and such a direction will be hereinafter referred to as a "thickness direction"). With this configuration, the partitioning member 3 exhibits favorable flexibility. On the other hand, the board thickness of the seal member 2A is 1.2 to 5.0 times (more preferably 1.5 to 3.0 times) as great as the board thickness of the partitioning member 3. With this configuration, the seal member 2A exhibits favorable durability and higher stiffness than that of the partitioning member.

First, the seal member 2A will be described with reference to FIGS. 2 to 4. Note that the seal member 2B has the substantially same configuration as that of the seal member 2A, and therefore, description thereof will be omitted or simplified in description below. The seal member 2A is an elongated member formed by extrusion molding with nickel-based alloy, linearly continuously extending in a longitudinal direction, and having a C-shape as viewed in the section. The seal member 2A includes a hollow 20 as a space defined by the seal member 2A, continuously extending in the longitudinal direction, and having an oval shape as viewed in plane, and a slit-shaped opening 21 formed between a pair of opposing side end portions extending along the longitudinal direction of the seal member 2A. The C-shaped section of the seal member 2A is in such a shape that a bottom portion linearly extending substantially in parallel with the bottom surface 51a of the groove 51, side portions curved in an arc shape at about 90 degrees from upper and lower end portions of the bottom portion to a clearance G side and extending to the clearance G side substantially in parallel with the inner surfaces 51b, 51c of the groove 51, and quadrant circular portions curved in an arc shape at about 90 degrees from end portions of the side portions to face and approach each other are continuous to each other.

Moreover, since the seal member 2A is the elongated member, the seal member 2A is easily bendable in the longitudinal direction. In addition, since the seal member 2A is formed in the C-shape, the pair of side end portions sandwiching the opening 21 moves close to each other or apart from each other, and therefore, the seal member 2A is easily extendable/contractable as in a spring.

Next, the partitioning member 3 will be described with reference to FIGS. 2 to 4. The partitioning member 3 is formed from a nickel-based alloy thin plate linearly continuously extending in the longitudinal direction. The partitioning member 3 includes the flat plate-shaped base portion 30a substantially linearly extending in the longitudinal direction, and projecting elements 30b, 30c formed by folding back of both end portions of the partitioning member 3 in a transverse direction thereof and having a greater thickness than that of the base portion 30a.

The dimension of the base portion 30a of the partitioning member 3 in the transverse direction is 10 to 100 times (more preferably 20 to 50 times) as great as the board thickness of the partitioning member 3, and the base portion 30a is easily elastically deformable in the transverse direction. Moreover, since the base portion 30a is in the flat plate shape elongated in the longitudinal direction, the base portion 30a is also easily elastically deformable in the longitudinal direction.

As illustrated in FIG. 4, the projecting element 30b is formed in a dome shape protruding to an inner surface 51b side of the groove 51, and a dome-shaped space is formed between the projecting element 30b and the base portion 30a along the longitudinal direction. The dome shape of the seal member 2A is such a shape that a bisection circular portion curved in an arc shape at about 180 degrees from the end portion of the base portion 30a to the inner surface 51b side of the groove 51, side portions linearly extending to the clearance G side substantially in parallel with the inner surface 51b, and quadrant circular portions curved in an arc shape at about 90 degrees from an end portion of the side portion to a base portion 30a side are continuous to each other. Similarly, the projecting element 30c is formed in a dome shape protruding to an inner surface 51c side of the groove 51, and communication along the longitudinal direction is allowed between the projecting element 30c and the base portion 30a. These projecting elements 30b, 30c are alternately formed on the front and back sides of the base portion 30a along the longitudinal direction.

Referring to FIG. 3, the multiple projecting elements 30b, 30c are scattered in the longitudinal direction on the inner surface 51b side or the inner surface 51c side of the groove 51. Thus, the base portion 30a positioned between adjacent ones of the projecting elements 30b in the longitudinal direction can be easily curved to the inner surface 51b side of the groove 51 in the transverse direction, and the base portion 30a positioned between adjacent ones of the projecting elements 30c can be easily curved to the inner surface 51c side of the groove 51 in the transverse direction. Thus, the partitioning member 3 exhibits excellent flexibility.

Moreover, since the projecting elements 30b, 30c are folded back to the front and back sides of the base portion 30a, the partitioning member 3 is easily arrangeable at a predetermined position with respect to the seal members 2A, 2B, and a portion between the projecting elements 30b, 30c adjacent to each other in the longitudinal direction can be easily curved in the thickness direction. Thus, the partitioning member 3 exhibits excellent flexibility. Further, the projecting elements 30b, 30c formed in the dome shape have spring properties in a normal direction (i.e., the thickness direction) of the base portion 30a.

These seal members 2A, 2B and the partitioning member 3 are made of the same material such as the same nickel-based alloy, and therefore, the amount of deformation due to thermal expansion is substantially equal among the seal members 2A, 2B and the partitioning member 3. Thus, the seal members 2A, 2B and the partitioning member 3 are less susceptible to influence of a deformation difference due to a temperature.

Next, assembly of the seal device 1 will be described with reference to FIG. 3. The board thickness of the partitioning member 3 is shorter than a dimension between the end portions of the seal member 2A sandwiching the opening 21, and the projecting elements 30b, 30c of the partitioning member 3 have a longer dimension in the thickness direction of the partitioning member 3 than the dimension between the pair of side end portions of the seal member 2A sandwiching the opening 21. Thus, the seal member 2A and the partitioning member 3 are coupled to each other in such a manner that the base portion 30a is inserted into the opening 21 and the seal member 2A and the partitioning member 3 are moved relative to each other in the longitudinal direction while the projecting elements 30b, 30c are housed in the hollow 20. Regarding the seal member 2B, the seal member 2B and the partitioning member 3 are coupled to each other as in the seal member 2A. In this manner, assembly of the seal device 1 is completed.

Note that in description below, a position relationship among the seal members 2A, 2B and the partitioning member 3 as illustrated in FIG. 2 will be described as a "neutral position," and a state at the neutral position will be described as a "neutral position state."

In the neutral position state, a state in which each of the projecting elements 30b, 30c partially contacts an inner surface 20a of the hollow 20 and return stress acts on the projecting elements 30b, 30c is brought. Moreover, at other portions, a slight clearance is formed between each projecting element 30b or each projecting element 30c and the inner surface 20a, and a great clearance is formed between the base portion 30a positioned on the opposite side of each projecting element 30b or each projecting element 30c and the inner surface 20a. Thus, the projecting elements 30b, 30c are easily turnable relative to the seal member 2A.

Next, a state in which the seal device 1 is inserted into the grooves 51 of the transition pieces 50A, 50B will be described with reference to FIG. 4. The seal device 1 inserted into the grooves 51 is pressed to the downstream side D in response to the pressure of the sealing target fluid P (see FIG. 1), and accordingly, the seal member 2A and the seal member 2B come into contact with the inner surfaces 51b of the grooves 51. At this point, the partitioning member 3 is, by the pressure of the sealing target fluid P, specifically slightly bent in a curved shape in the transverse direction such that the center of the base portion 30a protrudes to the downstream side D, but such a bending amount is small. Thus, the base portion 30a is illustrated as a linear shape in FIG. 4. Note that an example where the dimensions of the seal members 2A, 2B in the thickness direction are formed smaller than the dimensions of the grooves 51 in the same direction has been described, but the seal members 2A, 2B may each closely contact the inner surfaces 51b, 51c of the grooves 51.

The partitioning member 3 extends across the seal members 2A, 2B to partition a portion inside each groove 51 into two spaces on the upstream side U and the downstream side D. Moreover, at a coupling portion between each of the seal members 2A, 2B and the partitioning member 3, the base portion 30a of the partitioning member 3 is inserted into the opening 21 of each of the seal members 2A, 2B with a slight clearance. Further, in the hollow 20, the dome-shaped projecting elements 30b, 30c are alternately arranged on the front and back sides of the base portion 30a across the longitudinal direction. This forms a labyrinth structure. With these configurations, the clearance G between the transition pieces 50A, 50B is sealed by the seal device 1 inserted into the grooves 51. Note that the board thickness of the base portion 30a may be adjusted such that the base portion 30a of the partitioning member 3 bent in the curved shape in the transverse direction by the pressure of the sealing target fluid P contacts the pair of side end portions sandwiching the opening 21 of each of the seal members 2A, 2B. With this configuration, seal properties at the coupling portion are further enhanced.

Figure 5:
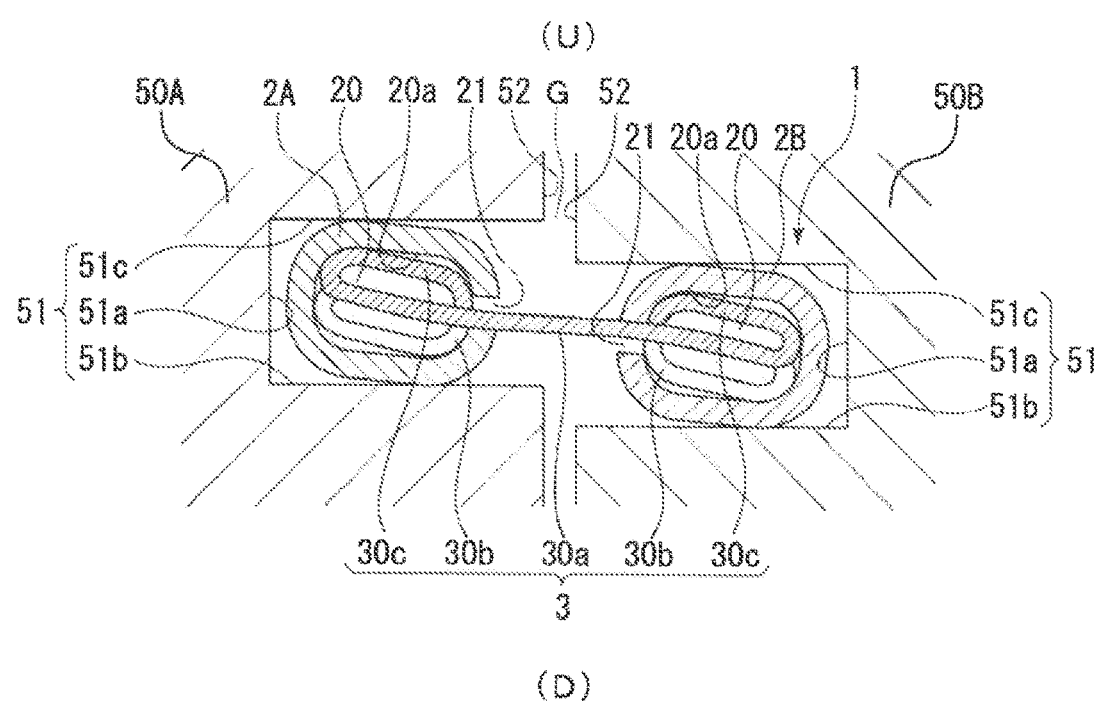
FIG. 5 is an A-A sectional view schematically illustrating the seal device according to the first embodiment when relative displacement of the grooves in the upper-lower direction in the plane of paper occurs.
Figure 6:
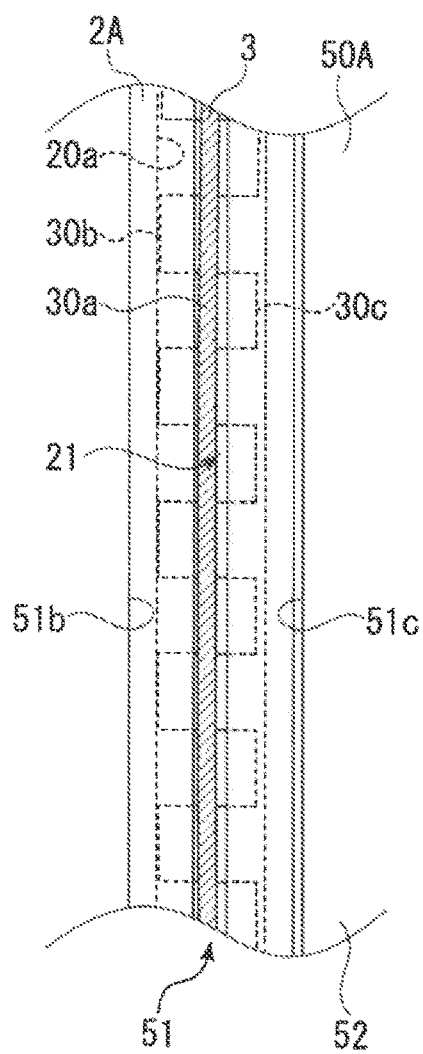
FIGS. 6A and 6B are B-B and C-C sectional views schematically illustrating the seal device according to the first embodiment when one groove is deformed in a longitudinal direction.
Figure 6:
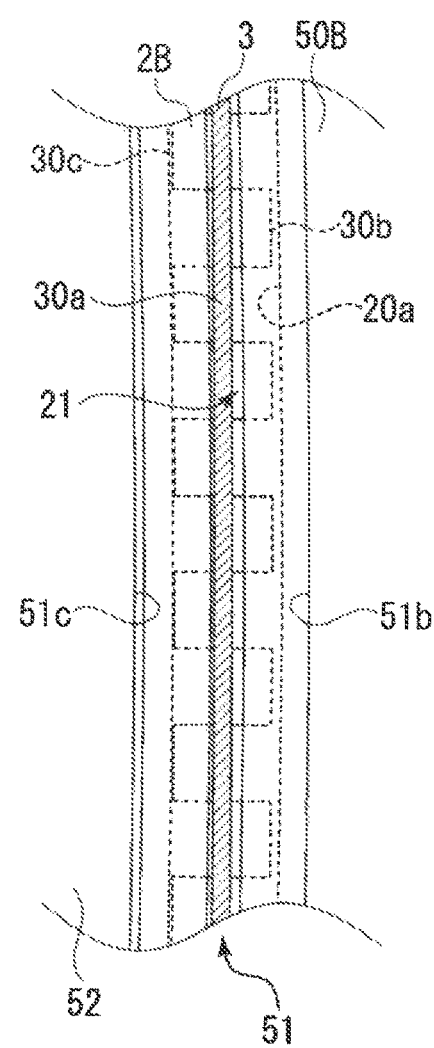

Next, the seal device 1 when relative displacement of the grooves 51 occurs due to, e.g., vibration upon operation of the gas turbine will be described with reference to FIGS. 4 and 5. When the transition pieces 50A, 50B relatively move to the upstream side U and the downstream side D and relative displacement of the grooves 51 in the upper-lower direction in the plane of paper occurs, the seal device 1 first tilts by a clearance A (see FIG. 4) between each of the seal members 2A, 2B and the inner surface 51c of the groove 51 in association with displacement. Each of the seal members 2A, 2B slightly turns in the clockwise direction. Accordingly, part of the upper left side of the seal member 2A in the plane of paper comes into contact with the inner surface 51c of the groove 51, and part of the lower right side of the seal member 2A in the plane of paper comes into contact with the inner surface 51b of the groove 51. Moreover, part of the upper left side of the seal member 2B in the plane of paper comes into contact with the inner surface 51c of the groove 51, and part of the lower right side of the seal member 2A in the plane of paper comes into contact with the inner surface 51b of the groove 51 (see FIG. 5).

Since turning of the seal members 2A, 2B is restricted, the base portion 30a starts elastically deforming in the transverse direction when the amount of relative displacement of the grooves 51 increases from a state in which the seal members 2A, 2B partially contact the inner surfaces 51c of the grooves 51. Stress generated by such elastic deformation increases, and accordingly, the projecting elements 30b, 30c turn relative to the seal members 2A, 2B. At this point, the seal members 2A, 2B are deformed and expanded such that clearances of the openings 21 become slightly larger, the projecting elements 30b, 30c of the partitioning member 3 are slightly pressed, and the base portion 30a of the partitioning member 3 is elastically deformed in the transverse direction. With this configuration, it is less likely to generate strong friction force between the seal members 2A, 2B and the groove 51, and it is less likely to generate great stress on the seal members 2A, 2B themselves and the partitioning member 3 itself. Thus, great deformation/damage of the seal members 2A, 2B and the projecting elements 30b, 30c is prevented. As described above, the seal device 1 tolerates relative displacement of the grooves 51 upon occurrence thereof, and therefore, can hold the seal properties.

Meanwhile, such relative displacement of the grooves 51 is brought under control, and therefore, the seal members 2A, 2B and the partitioning member 3 relatively turn to the neutral position by the substantially same mechanism as that upon occurrence of displacement. Elastic deformation of the base portion 30a of the partitioning member 3 in the transverse direction is brought under control, and tilting of the seal device 1 is brought under control in association with displacement reduction. Thus, the seal members 2A, 2B and the partitioning member 3 return to the neutral position state.

Note that depending on the degree of relative displacement of the grooves 51, the seal device 1 may tolerate displacement merely by tilting in some cases, or may tolerate displacement by elastic deformation of the base portion 30a of the partitioning member 3 in the transverse direction in addition to tilting in other cases. Moreover, depending on the materials/board thicknesses of the seal members 2A, 2B and the partitioning member 3, the degree of displacement, and the pressure of the sealing target fluid P, the seal device 1 may tolerate displacement in such a manner that the base portion 30a of the partitioning member 3 is elastically deformed in the transverse direction with the seal members 2A, 2B being in surface contact with the inner surfaces 51b of the grooves 51 as in the neutral position state. Needless to say, operation of the seal device 1 is changeable depending on, e.g., performance and use environment of the seal device 1, and therefore, is not limited to the above-described operation. The same also applies to description below.

Next, the seal device 1 when one (the transition piece 50B in this case) of the grooves 51 is deformed and curved in the longitudinal direction relative to the other one (the transition piece 50A in this case) of the grooves 51 due to, e.g., thermal expansion caused by a high temperature of the gas turbine will be described with reference to FIGS. 6A and 6B. Note that description overlapping with description regarding occurrence of relative displacement of the grooves 51 will be omitted.

As illustrated in FIG. 6B, the seal member 2B inserted into the groove 51 of the transition piece 50B deformed in an arc shape is pressed by the sealing target fluid P (see FIG. 1), and accordingly, is bent in a curved shape in the longitudinal direction in association with such deformation of the groove 51. The partitioning member 3 exhibits excellent flexibility in the longitudinal direction as described above, and the projecting elements 30b, 30c have higher stiffness than that of the base portion 30a. Thus, the base portion 30a of the partitioning member 3 is elastically deformed in the longitudinal direction in association with bending of the seal member 2B.

Moreover, as illustrated in FIG. 6A, the base portion 30a of the partitioning member 3 is elastically deformed in the longitudinal direction in association with bending of the seal member 2B as described above. The seal member 2A inserted into the groove 51 of the non-deformed transition piece 50A is in the substantially same state as the neutral position state in the present embodiment in which the deformation amount is slight. Note that although not shown in the figure, the seal member 2A is also bent in a curved shape depending on the amount of deformation of the seal member 2B in some cases.

As described above, in the seal device 1, even when one groove 51 itself is relatively deformed, the partitioning member 3 and the seal members 2A, 2B move relative to each other accordingly, and the amount of deformation of one groove 51 is absorbed. Further, the state of contact between the inner surface 51b of the groove 51 and the seal member 2B is easily holdable, and therefore, the seal properties are held.

Note that when relative displacement of the grooves 51 due to vibration as described above and relative deformation of one groove 51 itself due to thermal expansion occur in a complex manner, the seal device 1 is operated in a complex manner in response to such a situation, and therefore, tolerates displacement, deformation, etc. occurred in a complex manner.

As described above, when relative displacement of the grooves 51 due to vibration, deformation of the groove 51 itself due to thermal expansion, etc. occur, each of the seal members 2A, 2B and the partitioning member 3 move relative to each other, and therefore, the seal device 1 can follow displacement, deformation, etc. Thus, the seal members 2A, 2B are easily equally contactable with the inner surfaces 51b, 51c of the grooves 51, locally-strong friction force is less generated at the seal members 2A, 2B, and internal stress generated in the seal members 2A, 2B can be decreased. Thus, the seal properties can be held over a long period of time.

Moreover, the seal device 1 is configured such that the seal members 2A, 2B protrude in the thickness direction from the partitioning member 3. Thus, even when relative displacement of the grooves 51 or deformation of the groove 51 itself occurs, direct contact of the partitioning member 3 with the transition pieces 50A, 50B is prevented. In addition, the seal members 2A, 2B are bent in the curved shape in the longitudinal direction as described above. Thus, relative movement of each of the seal members 2A, 2B is less caused because each of the seal members 2A, 2B contacts one of the inner surfaces 51b, 51c of the groove 51, and the seal members 2A, 2B exhibit favorable durability. With these configurations, it is less likely to cause a hole due to abrasion caused by contact with the transition pieces 50A, 50B across the entirety of the seal device 1.

Moreover, the partitioning member 3 is the thin plate exhibiting favorable flexibility, and is also movable relative to the seal members 2A, 2B. Thus, even when internal stress in, e.g., a shearing/compression/tensile/curving direction is caused in association with relative displacement of the grooves 51, the partitioning member 3 can follow such displacement and can be elastically deformed. Moreover, occurrence of cracking or rupturing is also prevented.

Further, even when turning or movement of the seal members 2A, 2B relative to the grooves 51, relative turning (movement) of the seal members 2A, 2B and the partitioning member 3, and bending/elastic deformation of the base portion 30a of the partitioning member 3 in response to relative displacement of the grooves 51 or deformation of the grooves 51 themselves do not fully return to the neutral position state after relative displacement of the grooves 51 or deformation of the grooves 51 themselves has been brought under control, if the partitioning member 3 is coupled to the seal members 2A, 2B inserted into the grooves 51, the seal properties can be held. Note that relative movement of the seal members 2A, 2B and the partitioning member 3 includes not only turning as described above, but also relative movement in the longitudinal direction, the transverse direction, and the thickness direction.

Second Embodiment

Figure 7:
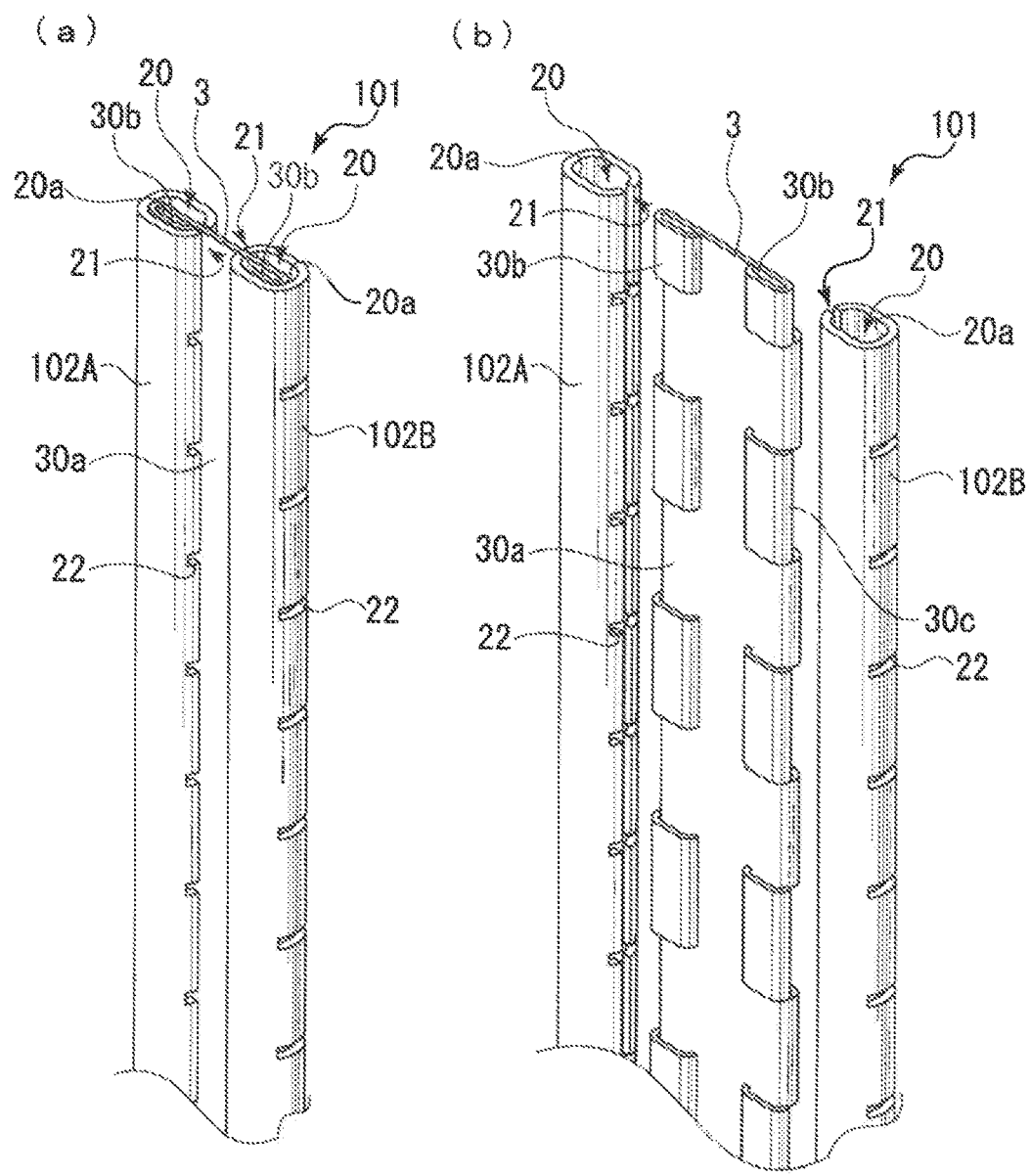
FIGS. 7A and 7B are a perspective view and an exploded perspective view illustrating a seal device according to a second embodiment of the present invention.

Next, a seal device according to a second embodiment of the present invention will be described with reference to FIGS. 7A and 7B. Note that the same reference numerals are used to represent the same components as those described in the above-described embodiment and overlapping description will be omitted.

The seal device 101 in the second embodiment will be described. As illustrated in FIGS. 7A and 7B, each of seal members 102A, 102B of the seal device 101 is, in the present embodiment, configured such that linear slits 22 penetrating from the outside of the seal member 102A or the seal member 102B to the hollow 20 and extending in a thickness direction are formed at substantially equal intervals in a longitudinal direction of the seal device 101 at an end portion on an opening 21 side and an end portion facing an opening 21. Thus, flexibility of the seal members 102A, 102B in a longitudinal direction thereof is enhanced. Consequently, excellent followability for relative displacement, deformation, etc. of grooves 51 is exhibited.

Note that the slits 22 may be formed at unequal intervals depending on, e.g., the shape of the groove 51 or the degree of deformation of the groove 51, and arrangement of the slits 22 may be changeable as necessary. Further, note that the slits 22 may be formed only on the opening 21 side of the seal member or may be formed only at the end portion facing the opening 21, and are not limited to above.

Third Embodiment

Figure 8:
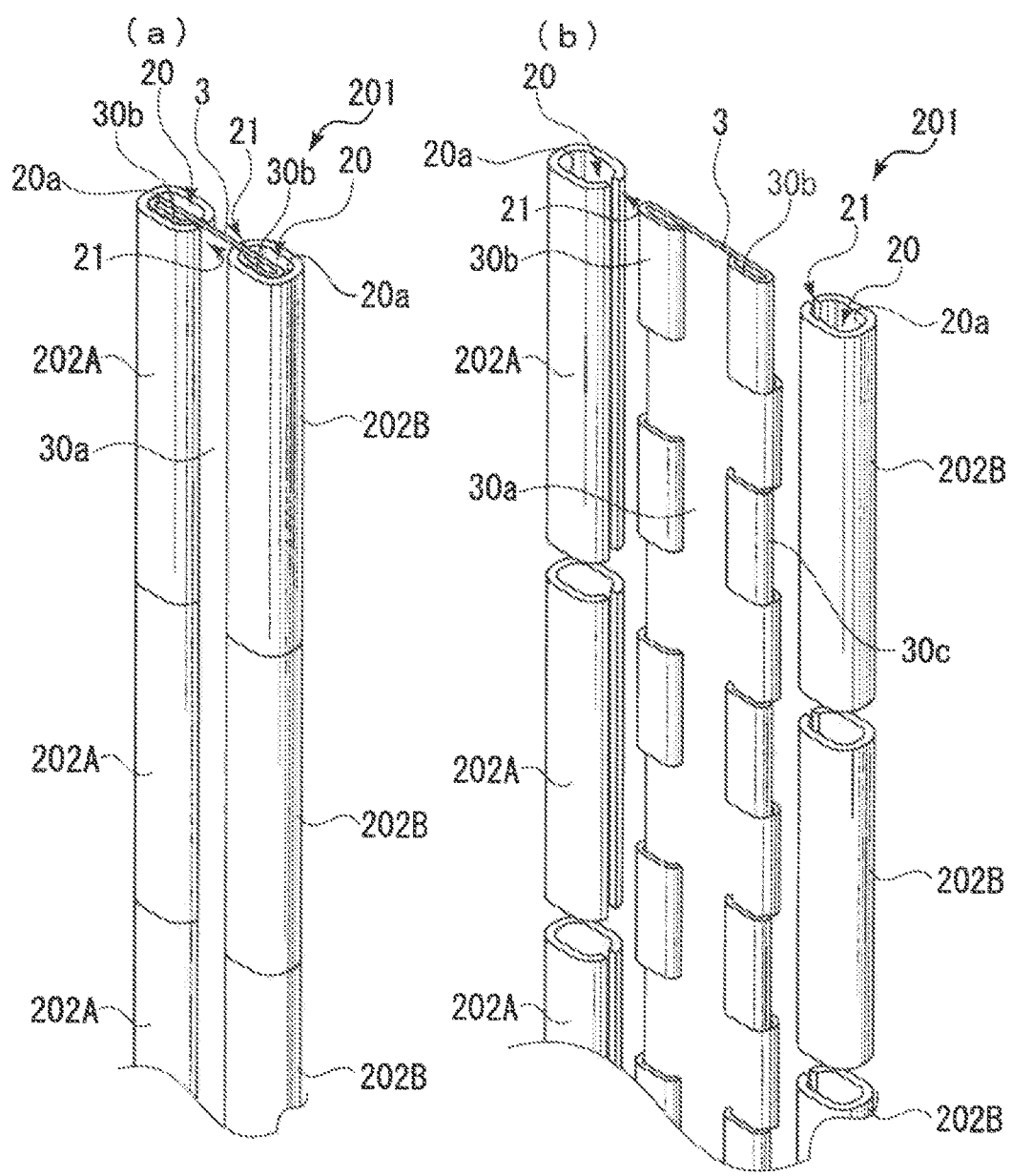
FIGS. 8A and 8B are a perspective view and an exploded perspective view illustrating a seal device according to a third embodiment of the present invention.

Next, a seal device according to a third embodiment of the present invention will be described with reference to FIGS. 8A and 8B. Note that the same reference numerals are used to represent the same components as those described in the above-described embodiments and overlapping description will be omitted.

The seal device 201 in the third embodiment will be described. As illustrated in FIGS. 8A and 8B, in the present embodiment, each of seal members 202A, 202B of the seal device 201 is substantially equally divided in a longitudinal direction, and the multiple seal members 202A or the multiple seal members 202B are coupled along a longitudinal direction of a partitioning member 3. With this configuration, adjacent ones of the seal members 202A or the seal members 202B in the longitudinal direction relatively tilt at coupling portions thereof, and therefore, flexibility of the coupled seal members 202A and the coupled seal members 202B in the longitudinal direction is enhanced. Consequently, the degree of freedom in relative movement of the coupled seal members 202A and the coupled seal members 202B is high.

Moreover, as compared to a case where the seal members 2A, 2B as the elongated members are coupled to the partitioning member 3, the multiple divided seal members 202A, 202B have a shorter dimension in the longitudinal direction, and therefore, a coupling process is facilitated.

Note that depending on, e.g., the shape of a groove 51 or the degree of deformation of the groove 51, the multiple seal members 202A, 202B may be formed to have unequal dimensions in the longitudinal direction of the partitioning member 3.

Fourth Embodiment

Figure 9:
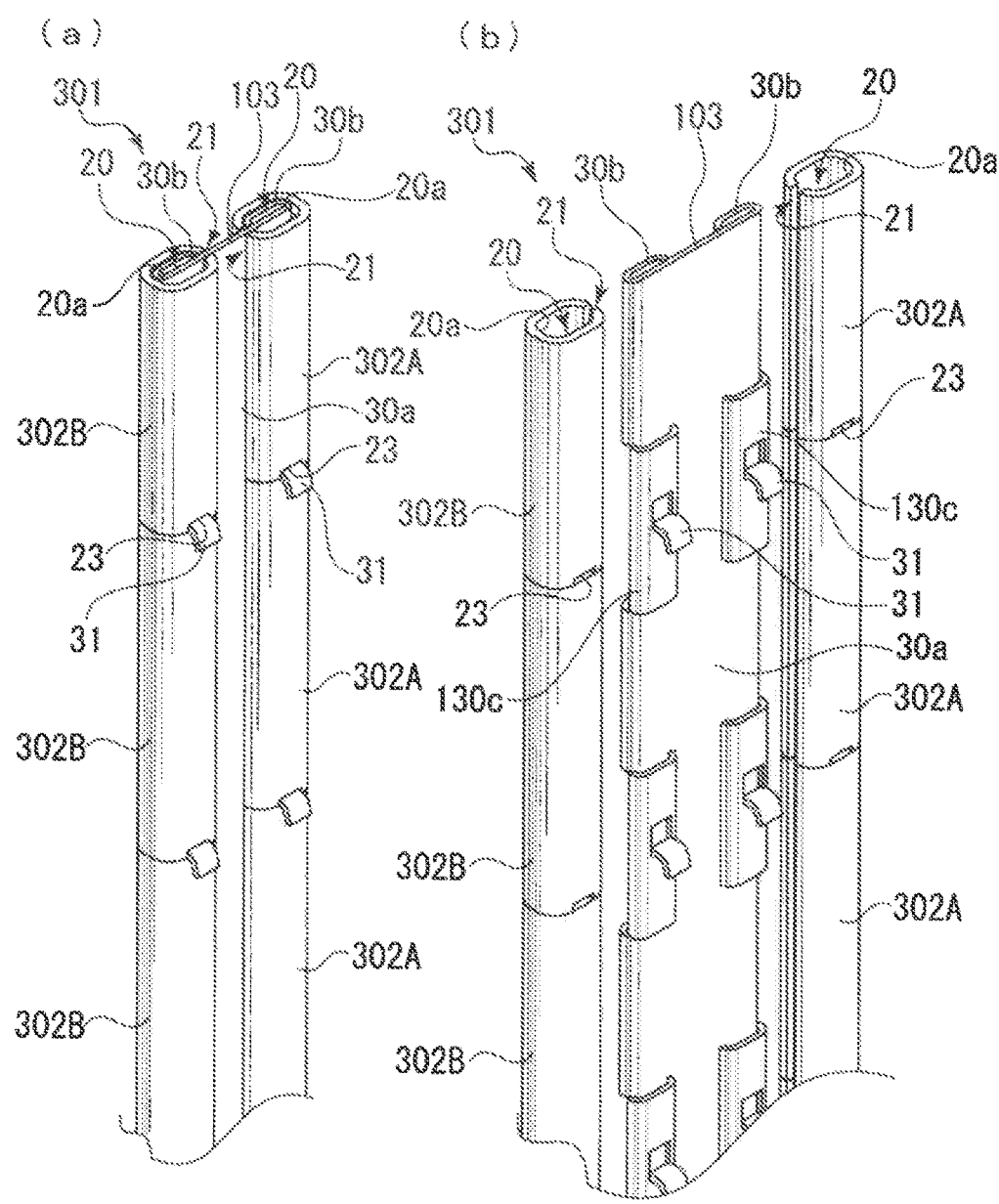
FIGS. 9A and 9B are a perspective view and an exploded perspective view illustrating a seal device according to a fourth embodiment of the present invention.

Next, a seal device according to a fourth embodiment of the present invention will be described with reference to FIGS. 9A and 9B. Note that the same reference numerals are used to represent the same components as those described in the above-described embodiments and overlapping description will be omitted.

The seal device 301 in the fourth embodiment will be described. As illustrated in FIGS. 9A and 9B, in the present embodiment, seal members 302A, 302B of the seal device 301 are divided at substantially equal intervals in a longitudinal direction. At each seal member 302A, 302B coupled to an adjacent one of the seal members 302A, 302B, a cutout portion 23 recessed in the longitudinal direction and penetrating in a thickness direction is formed at one end portion on an inner surface 51c (see FIG. 4) side of a groove 51. Moreover, at each projecting element 130c of a partitioning member 103, a plate spring portion 31 cut and raised in a rectangular shape to protrude a side (i.e., the inner surface 51c side of the groove 51) apart from a base portion 30a and shaped in a plate spring shape is formed. These plate spring portions 31 are arranged at substantially equal intervals in a longitudinal direction of the partitioning member 103, and have spring properties in a normal direction (i.e., the thickness direction) of the base portion 30a.

In the seal device 301, when the seal members 302A, 302B and the partitioning member 103 are coupled to each other, the plate spring portions 31 protrude to the outside (i.e., a side of the inner surface 51c of the groove 51) of the seal member 302A or the seal member 302B through the cutout portions 23. Thus, when the seal device 301 is inserted into the grooves 51, a state in which each plate spring portion 31 contacts an inner surface 51c of the groove 51 and return stress acts on each plate spring portion 31 is brought, and the seal members 302A, 302B more closely contact inner surfaces 51b (see FIG. 4) of the grooves 51. Consequently, seal properties can be improved. In addition, movement of the seal device 301 itself relative to the grooves 51 in the longitudinal direction, a transverse direction, and the thickness direction is reduced, and therefore, rattling of the seal device 301 in the grooves 51 can be reduced.

Note that the cutout portions 23 and the plate spring portions 31 may be formed only on a seal member 302A side or a seal member 302B side, and are not limited to above. Similarly, the plate spring portions 31 may be arranged at unequal intervals. Accordingly, the dimension of the seal member in the longitudinal direction may be adjusted according to arrangement of the plate spring portions 31. Moreover, the plate spring portions 31 may protrude outwardly through through-holes formed to penetrate from the outside of the seal member to an inner space, and the cutout portions 23 are not limited to above.

Fifth Embodiment

Figure 10:
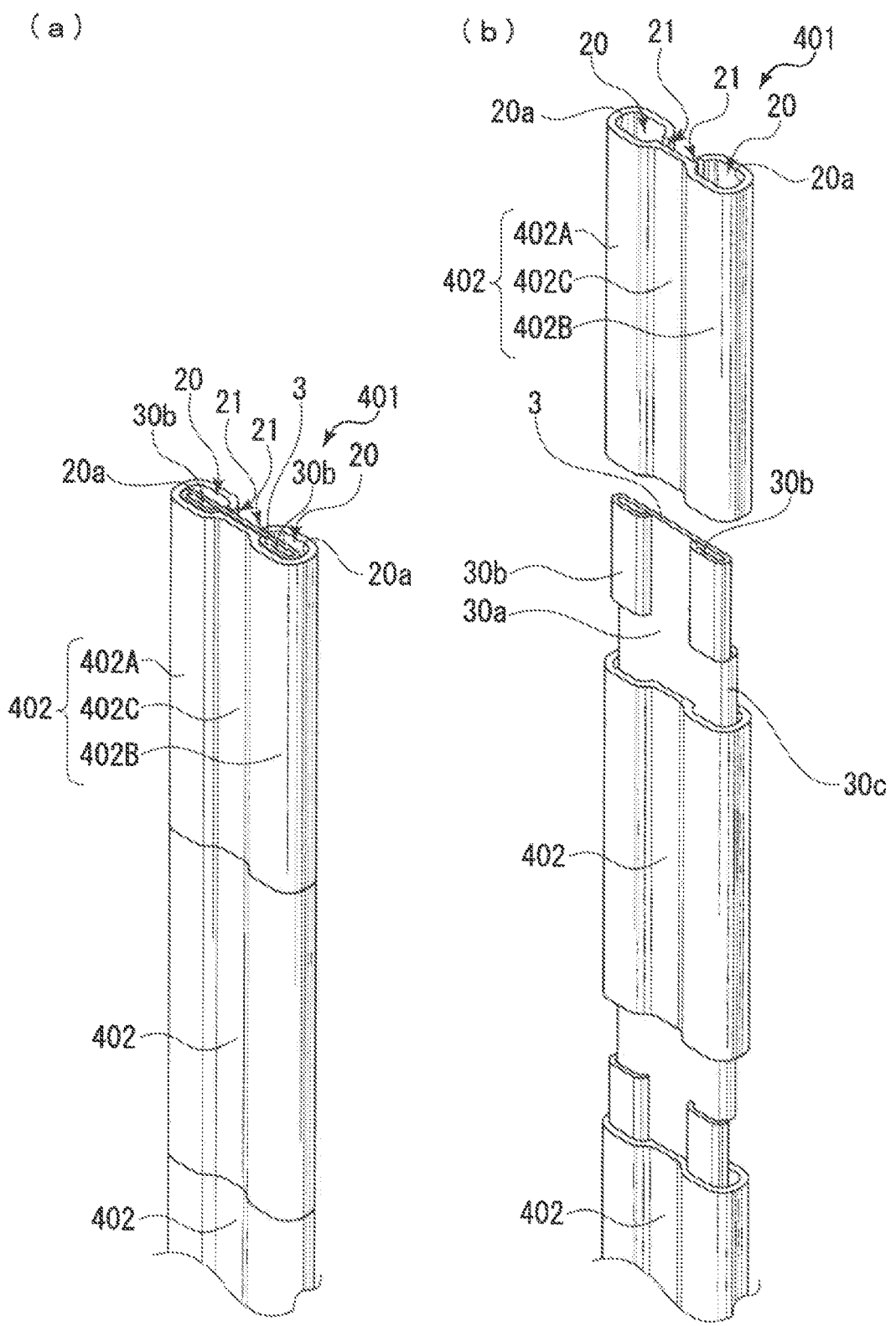
FIGS. 10A and 10B are a perspective view and an exploded perspective view illustrating a seal device according to a fifth embodiment of the present invention.

Next, a seal device according to a fifth embodiment of the present invention will be described with reference to FIGS. 10A and 10B. Note that the same reference numerals are used to represent the same components as those described in the above-described embodiments and overlapping description will be omitted.

The seal device 401 in the fifth embodiment will be described. As illustrated in FIGS. 10A and 10B, in the present embodiment, each seal body member 402 of the seal device 401 is configured such that seal members 402A, 402B divided in a longitudinal direction are coupled to each other as one member through a coupling portion 402C. With this configuration, a coupling process is facilitated as compared to a case where the multiple divided seal members 202A, 202B are separately coupled to the partitioning member 3.

Moreover, the seal body member 402 is configured such that the seal members 402A, 402B are coupled by the coupling portion 402C, and therefore, exhibits excellent seal properties.

Sixth Embodiment

Next, a seal device according to a sixth embodiment of the present invention will be described with reference to FIGS. 11A and 11B. Note that the same reference numerals are used to represent the same components as those described in the above-described embodiments and overlapping description will be omitted.

The seal device 501 in the sixth embodiment will be described. As illustrated in FIG. 11A, in the present embodiment, a partitioning member 203 of the seal device 501 is bent in a curved shape such that a substantially center portion of a base portion 230a in a transverse direction protrudes to a projecting element 30b side. Both end portions of the partitioning member 203 in the transverse direction are movable close to each other or apart from each other, and therefore, the partitioning member 203 is easily extendable/contractable as in a spring.

Figure 11:
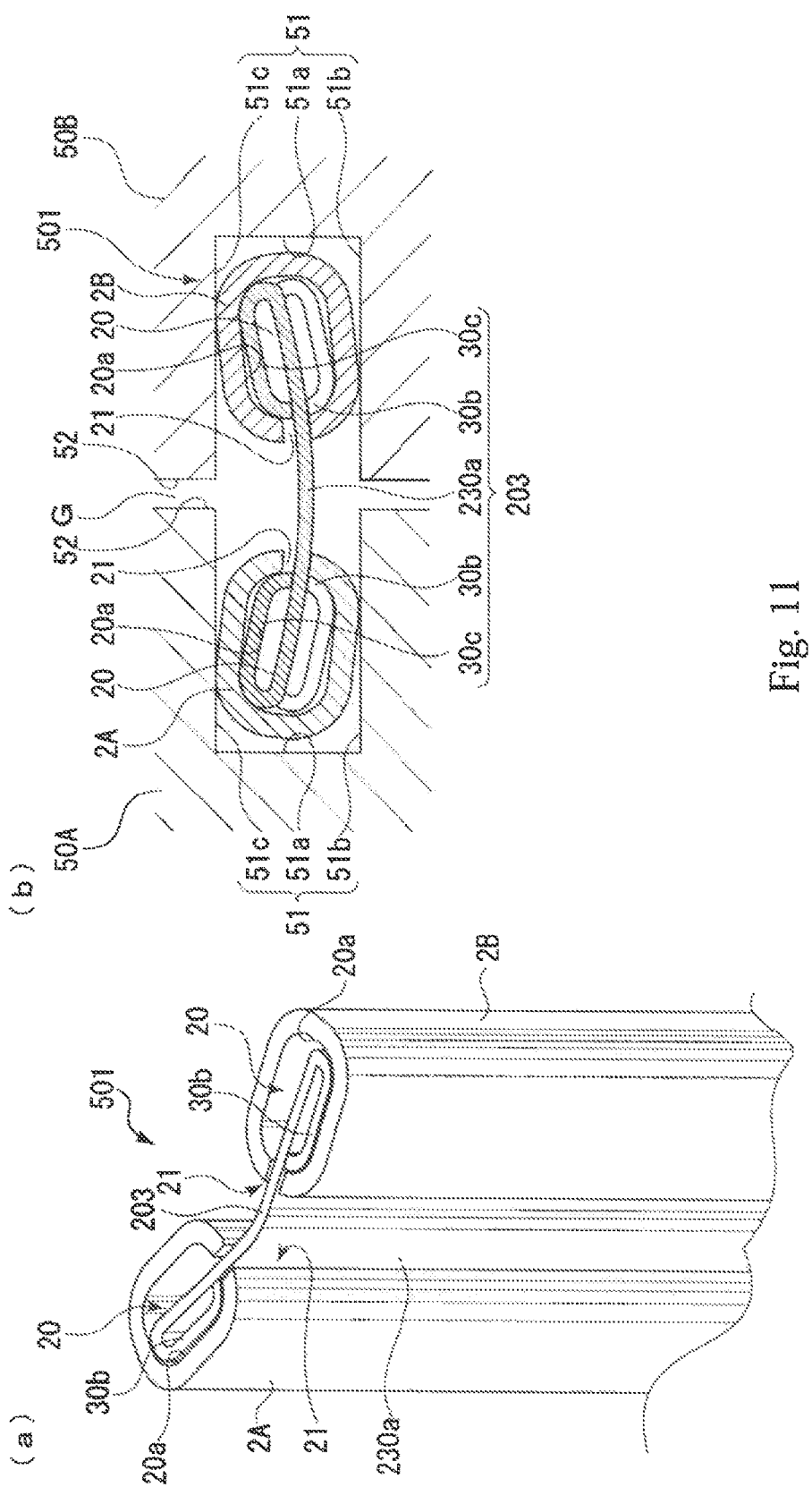
FIG. 11A is a perspective view illustrating a seal device according to a sixth embodiment of the present invention.
FIG. 11B is a plan sectional view illustrating the seal device according to the sixth embodiment inserted into each groove.

As illustrated in FIG. 11B, the seal device 501 inserted into grooves 51 is in such a state that the seal device 501 is bent in a curved shape such that the base portion 230a protrudes to the projecting element 30b side. By action of return force generated by separation of both end portions in the transverse direction and extension of the base portion 230a and deformation force for pressing, in a protruding direction, the substantially center portion of the base portion 230a in the transverse direction by the pressure of sealing target fluid P (see FIG. 1) to elastically deform the base portion 230a such that both end portions in the transverse direction move close to each other, part of the upper left side of a seal member 2A in the plane of paper is pressed by an inner surface 51c of the groove 51, and part of the lower right side of the seal member 2A in the plane of paper is pressed by an inner surface 51b of the groove 51. Moreover, part of the upper right side of a seal member 2B in the plane of paper is pressed by an inner surface 51c of the groove 51, and part of the lower left side of the seal member 2B in the plane of paper is pressed by an inner surface 51b of the groove 51. Thus, the seal members 2A, 2B more closely contact the inner surfaces 51b, 51c of the grooves 51, and therefore, seal properties can be improved. Moreover, movement of the seal device 501 itself relative to the grooves 51 in a longitudinal direction, the transverse direction, and a thickness direction is reduced, and therefore, rattling of the seal device 501 in the grooves 51 can be reduced.

Seventh Embodiment

Figure 12:
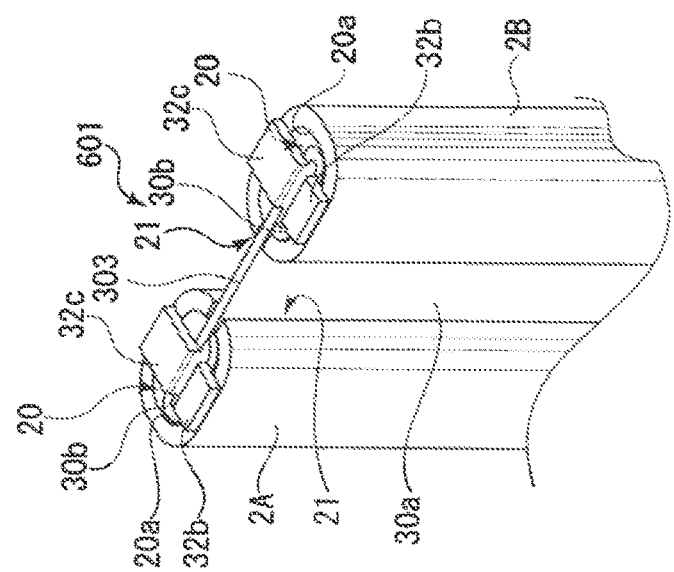
FIG. 12 is a perspective view illustrating a seal device according to a seventh embodiment of the present invention.

Next, a seal device according to a seventh embodiment of the present invention will be described with reference to FIG. 12. Note that the same reference numerals are used to represent the same components as those described in the above-described embodiments and overlapping description will be omitted.

The seal device 601 in the seventh embodiment will be described. As illustrated in FIG. 12, in the present embodiment, a folded-back portion 32b protruding outwardly from an end portion of a seal member 2A or a seal member 2B in a longitudinal direction thereof and folded back to an inner surface 51b side of a groove 51 and a folded-back portion 32c similarly folded back to an inner surface 51c side of the groove 51 are formed at each end portion of a partitioning member 303 of the seal device 601 in a longitudinal direction thereof. The folded-back portions 32b, 32c contact the end portion of the seal members 2A, 2B. With this configuration, movement of the seal members 2A, 2B relative to the partitioning member 303 in the longitudinal direction is restricted.

Note that a form in which the folded-back portions are separated from the partitioning member and are welded and fixed to the partitioning member after the partitioning member and the seal members have been coupled to each other may be employed other than the folded-back portions 32b, 32c, or the partitioning member and the seal members may be merely welded and fixed to each other.

Eighth Embodiment

Figure 13:
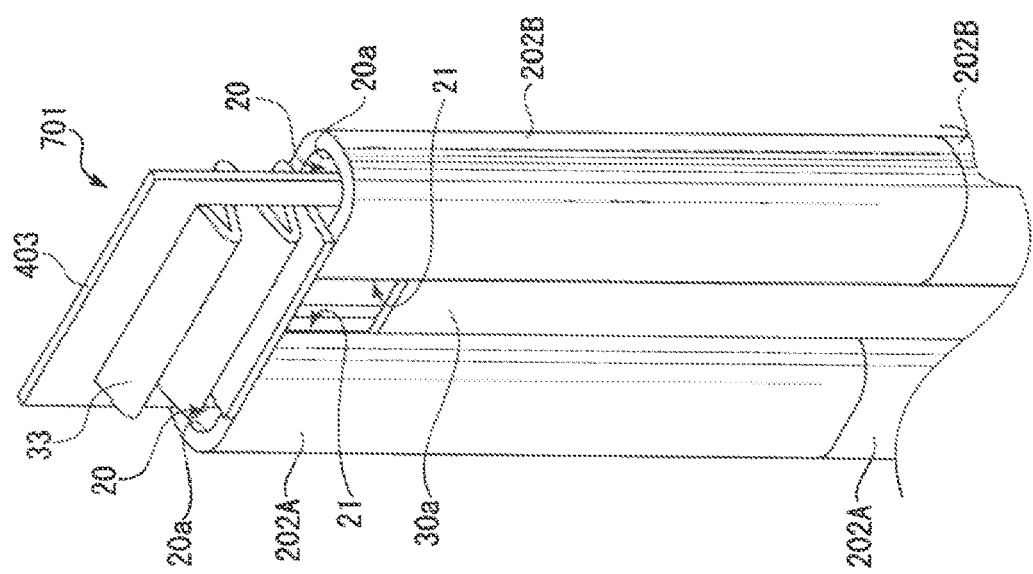
FIG. 13 is a perspective view illustrating a seal device according to an eighth embodiment of the present invention.

Next, a seal device according to an eighth embodiment of the present invention will be described with reference to FIG. 13. Note that the same reference numerals are used to represent the same components as those described in the above-described embodiments and overlapping description will be omitted.

The seal device 701 in the eighth embodiment will be described. As illustrated in FIG. 13, in the present embodiment, at one end portion of a partitioning member 403 of the seal device 701 in a longitudinal direction thereof, an accordion-shaped plate spring portion 33 is formed in such a manner that a center portion of such an end portion is cut and raised in a rectangular shape and is shaped in an accordion shape. The accordion-shaped plate spring portion 33 protrudes from end portions of a seal member 202A and a seal member 202B in a longitudinal direction thereof, and contacts the end portions of the seal members 202A, 202B in the longitudinal direction thereof. Moreover, at the other end portion of the partitioning member 403 in the longitudinal direction thereof, folded-back portions 32b, 32c are formed (see FIG. 12).

With this configuration, movement of the coupled seal members 202A and the coupled seal members 202B relative to the partitioning member 403 in the longitudinal direction can be restricted, and the seal members 202A and the seal members 202B are pressed toward the folded-back portions 32b, 32c of the partitioning member 403 by the accordion-shaped plate spring portion 33. Thus, a non-contact state of adjacent ones of the seal members 202A or adjacent ones of the seal members 202B can be prevented, and therefore, seal properties can be reliably held.

Note that other than the accordion-shaped plate spring portion 33, a coil spring or a bellows may be welded and fixed to protrude toward the end portion of the seal member, and the present invention is not limited to the accordion-shaped plate spring portion 33. Further, note that a form in which the accordion-shaped plate spring portion is separated from the partitioning member and is welded and fixed to the partitioning member after the partitioning member and the seal members have been coupled to each other may be employed.

The embodiments of the present invention have been described above with reference to the drawings, but specific configurations are not limited to these embodiments. Changes and additions made without departing from the scope of the present invention are included in the present invention.

For example, the slits 22 of the second embodiment may be applied to each of the divided seal members of the third to fifth embodiments. The cutout portions 23 and the plate spring portions 31 of the fourth embodiment may be applied to the seal members and the partitioning member of the first, fifth, and sixth embodiments. As in the coupling portion 402C of the fifth embodiment, the pair of seal members formed continuously in the longitudinal direction in the first and second embodiments may be configured as an integrated seal body member by means of a coupling portion. Each of the divided seal members of the third to fifth embodiments may be coupled to the partitioning member 203 of the sixth embodiment. The folded-back portions 32b, 32c and the accordion-shaped plate spring portion 33 of the seventh and eighth embodiments may be applied to the first to sixth embodiments. The configurations of the first to eighth embodiments may be combined as necessary depending on the intended use.

Moreover, the first to eighth embodiments have been described that the seal device is in the form used for sealing a portion between the transition pieces 50A, 50B, but the present invention is not limited to above. The seal device may be used for, e.g., multiple platforms, multiple division walls, and multiple shrouds forming a housing structure of power equipment.

Each seal member and the partitioning member are not limited to nickel-based alloy as long as these components are made of alloy containing nickel, such as nickel super-alloy or stainless steel. On the other hand, these components may be made of ceramic or metal containing no nickel depending on the intended use.

Moreover, each seal member and the partitioning member have been described as the form in which these components are coupled with the base portion 30a being inserted into the openings 21 and the projecting elements 30b, 30c being housed in the hollows 20, but the present invention is not limited to above. Each seal member may be coupled in such a hinge shape that each seal member is turnable and pivotable relative to the partitioning member.

The projecting elements of the partitioning member have been described as the form in which the hollow dome-shaped projecting elements are alternately formed on the front and back sides of the base portion 30a across the longitudinal direction, but the shape thereof is not limited to above. The projecting element may be formed in, e.g., a solid dome shape, the shape of a hollow rectangular tubular body, the shape of a multilayer plate contacting the base portion, or a cylindrical shape protruding in the transverse direction of the base portion.

Moreover, regarding arrangement of the projecting elements of the partitioning member, adjacent ones of the alternately-formed projecting elements may be apart from each other in the longitudinal direction, or the projecting elements may be arranged on the inner surface 51b side or the inner surface 51c side of the groove 51 or may be continuously formed across the longitudinal direction so as to form one continuous projecting portion at each end of the partitioning member. The present invention is not limited to above.

Further, each projecting element of the partitioning member has been described as the form in which each projecting element is formed in such a manner that both end portions of the partitioning member 3 in the transverse direction are folded back, but the present invention is not limited to above. As long as the seal members and partitioning member can be integrally formed, a form in which each projecting element formed separately from the base portion is fixed by, e.g., welding may be employed.

REFERENCE SIGNS LIST

1 Seal device
2A, 2B Seal member (First and Second seal members)
3 Partitioning member
20 Hollow
21 Opening
30a Base portion
30b, 30c Projecting element (Projecting portion)
50A, 50B Transition piece (First and Second components)
51 Groove
101 to 701 Seal device
102A to 402A Seal member (First or Second seal member)
102B to 402B Seal member (Second or First seal member)
103 to 403 Partitioning member
130c Projecting element (Projecting portion)
203 Partitioning member
230a Base portion

The invention claimed is:

1. A seal device inserted into and disposed between grooves each formed at each of first and second components which are adjacent to each other and collectively form a housing structure, comprising:
  a first seal member inserted into the groove of the first component;
  a second seal member inserted into the groove of the second component; and
  a partitioning member extending between the first and second seal members to partition a space between the grooves of the first and second components and arranged movably relative to the first and second seal members, wherein
    the partitioning member includes a base portion formed in a flat plate shape and projecting portions formed at both ends of the base portion in a transverse direction thereof and extending in a longitudinal direction of the partitioning member and having a greater thickness than that of the base portion, and wherein
    each of the first and second seal members is provided with a hollow in which the projecting portions are housed and an opening which is formed with a shorter dimension in a thickness direction than a dimension of each projecting portion in the thickness direction and into which the base portion is inserted.

2. The seal device according to claim 1, wherein the partitioning member is formed from a thin plate.

3. The seal device according to claim 2, wherein the projecting portions are formed in such a manner that both end portions of the partitioning member in a transverse direction thereof are folded back.

4. The seal device according to claim 3, wherein each of the projecting portions is divided into multiple projecting elements scattered in the longitudinal direction.

5. The seal device according to claim 4, wherein the projecting elements are sorted into a first group in which the projecting elements are formed by folding back the end portions of the partitioning member to a front side of the base portion and a second group in which the projecting elements are formed by folding back the end portions of the partitioning member to a back side of the base portion.

6. The seal device according to claim 2, wherein each of the projecting portions is divided into multiple projecting elements scattered in the longitudinal direction.

7. The seal device according to claim 6, wherein the projecting elements are sorted into a first group in which the projecting elements are formed by folding back the end portions of the partitioning member to a front side of the base portion and a second group in which the projecting elements are formed by folding back the end portions of the partitioning member to a back side of the base portion.

8. The seal device according to claim 2, wherein the first and second seal members and the partitioning member are made of identical alloy containing nickel.

9. The seal device according to claim 1, wherein the projecting portions are formed in such a manner that both end portions of the partitioning member in a transverse direction thereof are folded back.

10. The seal device according to claim 9, wherein each of the first and second seal members is divided into plural parts aligned in the longitudinal direction thereof.

11. The seal device according to claim 9, wherein the first and second seal members and the partitioning member are made of identical alloy containing nickel.

12. The seal device according to claim 1, wherein each of the projecting portions is divided into multiple projecting elements scattered in the longitudinal direction.

13. The seal device according to claim 12, wherein the projecting elements are sorted into a first group in which the projecting elements are formed by folding back the end portions of the partitioning member to a front side of the base portion and a second group in which the projecting elements are formed by folding back the end portions of the partitioning member to a back side of the base portion.

14. The seal device according to claim 1, wherein each of the first and second seal members is divided into plural parts aligned in the longitudinal direction thereof.

15. The seal device according to claim 1, wherein the first and second seal members and the partitioning member are made of identical alloy containing nickel.

* * * * *